United States Patent
Chan et al.

(10) Patent No.: US 10,116,760 B2
(45) Date of Patent: Oct. 30, 2018

(54) ACTIVE DATA PUSH SYSTEM AND ACTIVE DATA PUSH METHOD

(71) Applicant: DELTA ELECTRONICS, INC., Taoyuan County (TW)

(72) Inventors: Chia-Ching Chan, Taoyuan County (TW); Tuan-Feng Chen, Taoyuan County (TW); Tung-Yi Hsieh, Taoyuan County (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 506 days.

(21) Appl. No.: 14/728,097

(22) Filed: Jun. 2, 2015

(65) Prior Publication Data
US 2016/0226988 A1    Aug. 4, 2016

(30) Foreign Application Priority Data

Jan. 29, 2015  (TW) .............................. 104102989 A

(51) Int. Cl.
| | |
|---|---|
| *H04L 29/08* | (2006.01) |
| *G06K 9/00* | (2006.01) |
| *H04W 4/02* | (2018.01) |
| *G06K 9/32* | (2006.01) |

(52) U.S. Cl.
CPC .......... *H04L 67/26* (2013.01); *G06K 9/00342* (2013.01); *G06K 9/00771* (2013.01); *G06K 9/3283* (2013.01); *H04W 4/023* (2013.01)

(58) Field of Classification Search
CPC  H04L 67/24; G06K 9/00342; G06K 9/00771; G06K 9/3283; H04W 4/23
USPC ........................................................ 709/204
See application file for complete search history.

(56) References Cited

U.S. PATENT DOCUMENTS

| | | | | |
|---|---|---|---|---|
| 6,549,625 | B1 * | 4/2003 | Rautila ................. | G01S 5/0045 380/258 |
| 2003/0229779 | A1 * | 12/2003 | Morais .............. | H04L 29/12009 713/153 |
| 2004/0219910 | A1 * | 11/2004 | Beckers .................. | H04L 67/20 455/422.1 |
| 2007/0271030 | A1 * | 11/2007 | Deurwaarder ......... | G01C 21/26 701/533 |
| 2012/0138389 | A1 * | 6/2012 | Furutani ................. | B66B 1/468 187/247 |

(Continued)

FOREIGN PATENT DOCUMENTS

| | | |
|---|---|---|
| CN | 101997885 | 3/2011 |
| CN | 103940438 | 7/2014 |

OTHER PUBLICATIONS

Office Action dated Jul. 24, 2018 from corresponding application No. CN 201510045035.1.

*Primary Examiner* — Kevin T Bates
*Assistant Examiner* — Chen-Liang Huang
(74) *Attorney, Agent, or Firm* — Hauptman Ham, LLP

(57) ABSTRACT

An active data push system comprising a plurality of human-detection devices and a management system is presented. The human-detection devices respectively send a trigger signal when detecting a human entrance into one of a plurality of zones. The management system recognizes the zone detected with the human entrance when receiving the trigger signal, and retrieves a basic data of each electronic device installed in the recognized zone, and transmits the retrieved basic data to a mobile device held by the human.

18 Claims, 12 Drawing Sheets

(56) References Cited

U.S. PATENT DOCUMENTS

| | | | | |
|---|---|---|---|---|
| 2012/0170902 A1* | 7/2012 | Zhu | .................. | H04N 5/76 |
| | | | | 386/223 |
| 2012/0296486 A1* | 11/2012 | Marriam | ................ | G05B 15/02 |
| | | | | 700/296 |
| 2014/0207281 A1* | 7/2014 | Angle | .................. | H04L 12/282 |
| | | | | 700/257 |
| 2014/0365018 A1* | 12/2014 | Kusukame | ......... | G05D 23/1917 |
| | | | | 700/276 |
| 2015/0141055 A1* | 5/2015 | Barrand | ................. | H04W 4/02 |
| | | | | 455/456.3 |
| 2015/0271341 A1* | 9/2015 | Kleiner | ................ | H04W 12/06 |
| | | | | 455/411 |

* cited by examiner

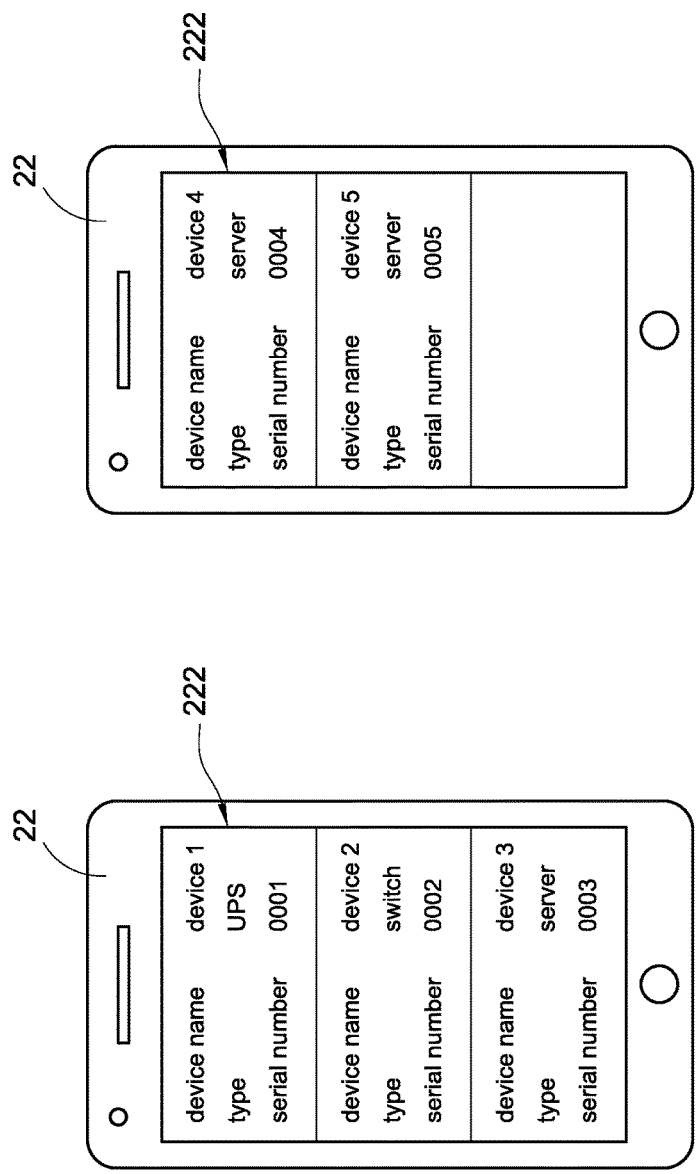

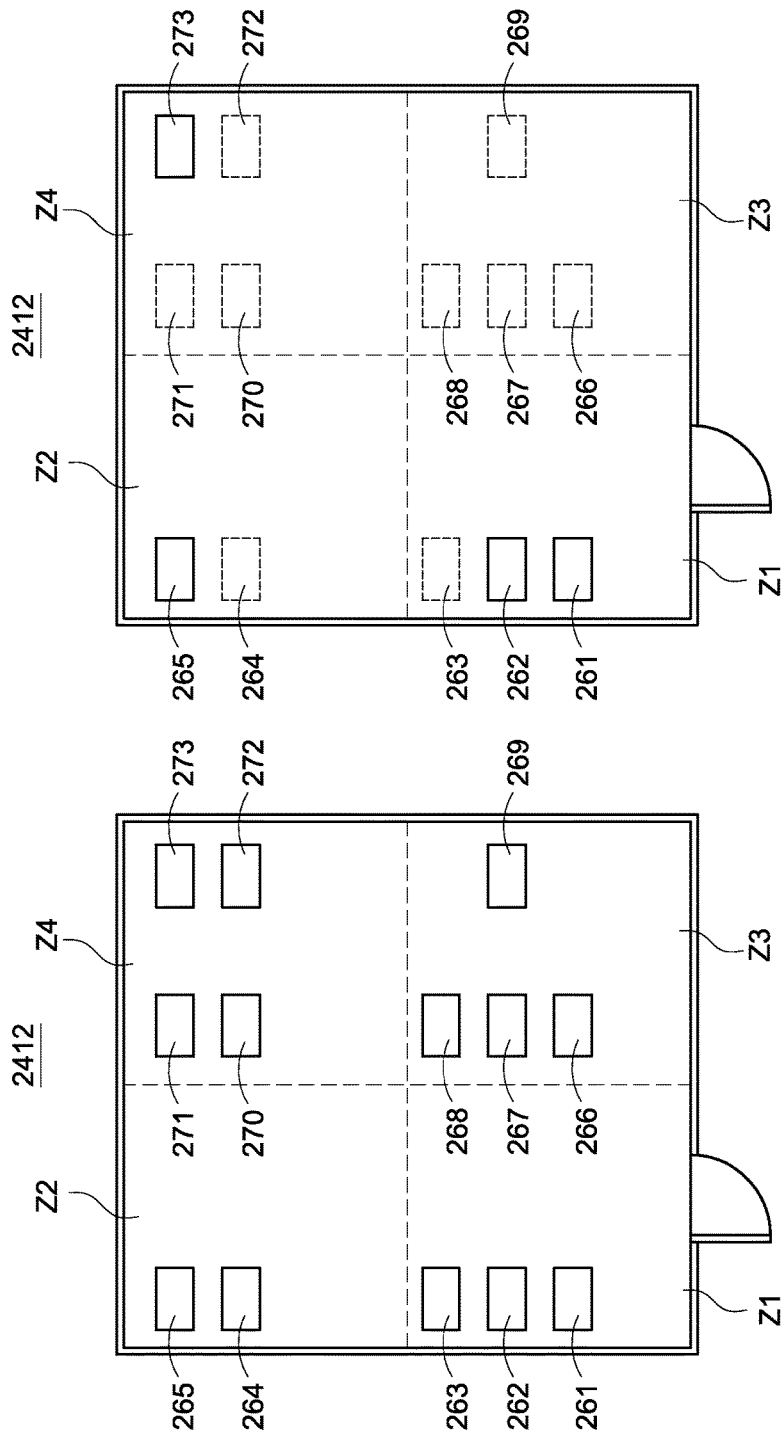

ic device. There is a
need to find out a better and more effective solution to
handle such problems.

ACTIVE DATA PUSH SYSTEM AND ACTIVE DATA PUSH METHOD

BACKGROUND OF THE INVENTION

Field of the Invention

The present disclosure relates to data push system and data push method, and in particularly to active data push system and active data push method.

Description of Related Art

With the rapid development of information technology, the request of network service (such as cloud storage service, online shopping service or online game service) is constantly increasing. To meet the constantly increased request of network service, the service provider must constantly expand the scale of the data center and constantly increase the number of the electronic devices (such as server) for providing network service with better quality.

However, with the increase of the number of the electronic devices, the degree of difficulty of recognizing a specific electronic device is also increased. Thus, it becomes an important issue to fast recognize the specific electronic device.

Please refer to FIG. 1 which illustrates a schematic diagram of an environment control system of the related-art. As shown in FIG. 1, an environment control system 1 of the related-art is installed in a data center, and comprises a plurality of electronic devices 10a-10i, a management system 12 and a reading device 18. The management system 12 is connected to the plurality of electronic devices 10a-10i via a network 14, and executes surveillance to the plurality of electronic devices 10a-10i. In the example illustrated in the FIG. 1, the plurality of electronic devices 10a-10c is installed in a first zone of the data center, the plurality of electronic devices 10d-10f is installed in a second zone of the data center, and the plurality of electronic devices 10g-10i is installed in a third zone of the data center.

The plurality of electronic devices 10a-10c is respectively pasted with a plurality of identifiers 100a-100i (such as Radio Frequency Identification tag (RFID tag) or barcode). The plurality of identifiers 100a-100i respectively record a plurality of basic data (such as device number) of the plurality of electronic devices 10a-10i.

A management personnel 16 can use the reading device 18 (such as a computer device installed a RFID reader or a barcode scanner) to read the one of the plurality of identifiers 100a-100i in proximity (take reading the identifier 100a for example) after entering the data center. Via reading the identifier 100a pasted on the surface of the electrically device 10a, the reading device 18 can decode the data recorded in the identifier 100a to retrieve the basic data of the electronic device 10a. Then, the reading device 18 can ask the management system 12 to search for a detailed data (such as device specification or current status) of the electronic device 10a according to the retrieved basic data. Via the environment control system 1 of the related-art, the management personnel 16 can know the plurality of detailed data of the plurality of electronic devices 10a-10i by respectively reading the plurality of identifiers 100a-100i.

However, the environment control system of the related-art has following disadvantages. (1) The cost of the management is increased because the management personnel must respectively paste the identifiers on the corresponded electronic devices. (2) It is not convenient for the management personnel because the management personnel must make the reading device close to the identifier for reading the information and the reading device only can read one identifier one time. (3) The device-purchasing cost is extra increased because the reading device must comprise the component being capable of reading the identifier. (4) Except maintaining the electronic device, the management personnel must extra maintain the identifiers (such as checking whether any identifier is defaced or any pasted position of the identifier are correct). Above reason not only increases the workload of the management personnel, but also makes the maintenance complex.

Therefore, the environment control system of the related-art comprises above disadvantages, and can't fast and efficiently recognize a specific electronic device. There is a need to find out a better and more effective solution to handle such problems.

SUMMARY OF THE INVENTION

The disclosure is directed to an active data push system and an active data push method which can actively push a relevant data of the electronic devices installed beside a human to a mobile device according to a position of the human.

One of the exemplary embodiments, an active data push system comprising: a plurality of human-detection devices respectively detecting a plurality of zones, and sending a trigger signal when detecting a human entrance into one of the zones; and a management system connected to the human-detection devices recognizing the zone corresponding to the trigger signal when receiving the trigger signal, the management system retrieving a plurality of basic data of a plurality of electronic devices installed in the recognized zone, and transmits the retrieved basic data to a mobile device via a network.

One of the exemplary embodiments, an active data push method used to an active data push system, the active data push system comprising a plurality of human-detection devices and a management system, the management system being connected to a plurality of electronic devices respectively installed in the different zones, the active data push method comprising following steps: a) the management system connecting to a mobile device via a network; b) the human-detection devices respectively executing human-detection to the zones, and sending a trigger signal when detecting that a human entrance into the zone; c) the management system recognizing the zone corresponding to the trigger signal when receiving the trigger signal; d) retrieving a basic data of each electronic device installed in the recognized zone; and e) transmitting the basic data to the mobile device.

This disclosed example can effectively make the human receive the relevant data of the electronic devices installed beside the human.

BRIEF DESCRIPTION OF DRAWING

FIG. 4A is a first screen schematic diagram of a mobile device according to a first embodiment of the present disclosed example;

FIG. 4B is a second screen schematic diagram of a mobile device according to a first embodiment of the present disclosed example;

FIG. 5A is an exemplary map according to a first embodiment of the present disclosed example;

FIG. 5B is an exemplary marked map according to a first embodiment of the present disclosed example;

DETAILED DESCRIPTION OF THE INVENTION

In cooperation with the attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 1:
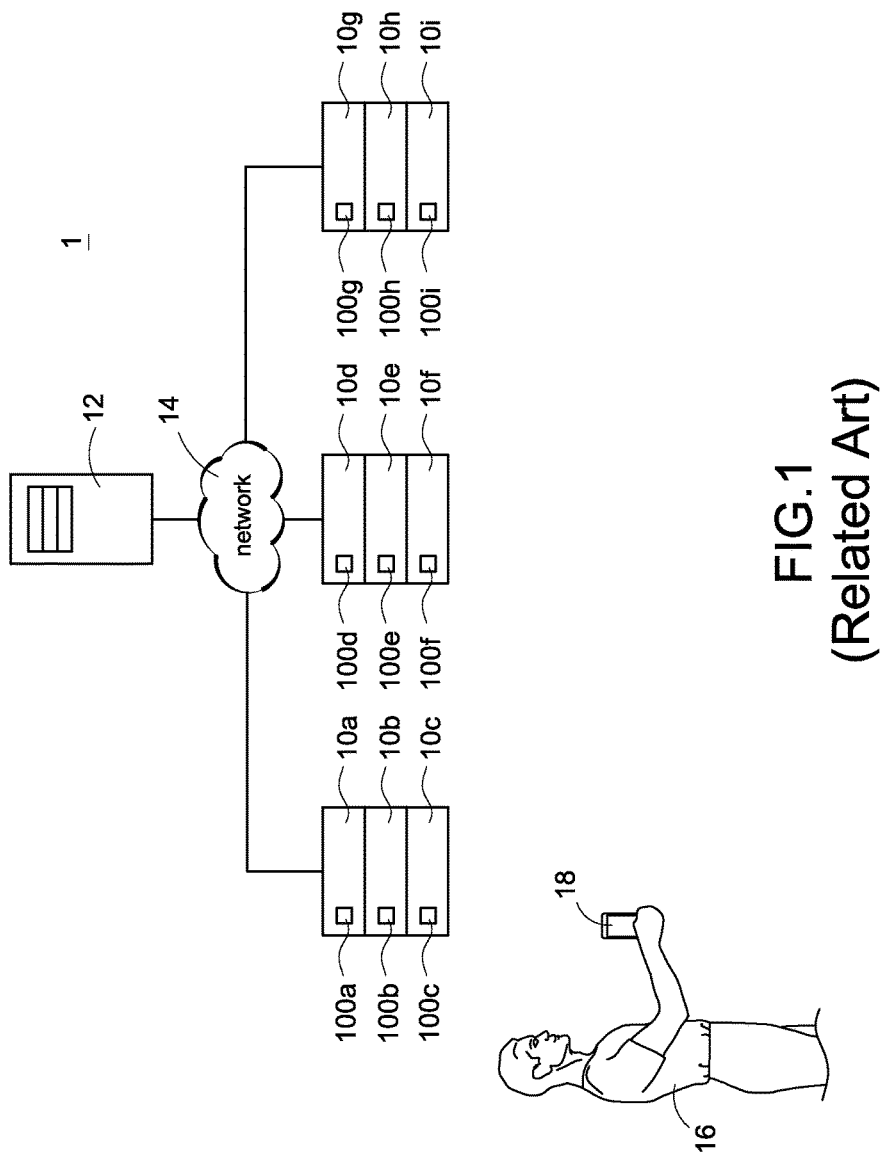
FIG. 1 is a schematic diagram of an environment control system of the related-art.

First, please refer to FIG. 1, which illustrates an architecture diagram of an active data push system according to a first embodiment of the present disclosed example. An active data push system 2 of this disclosed example is an environment control system preferably used to a place installed a large number of the electronic devices, such as a data center, a computer room or a factory building (following description will take the active data push system 2 being installed in the data center for example to explain the present disclosed example).

Figure 2:
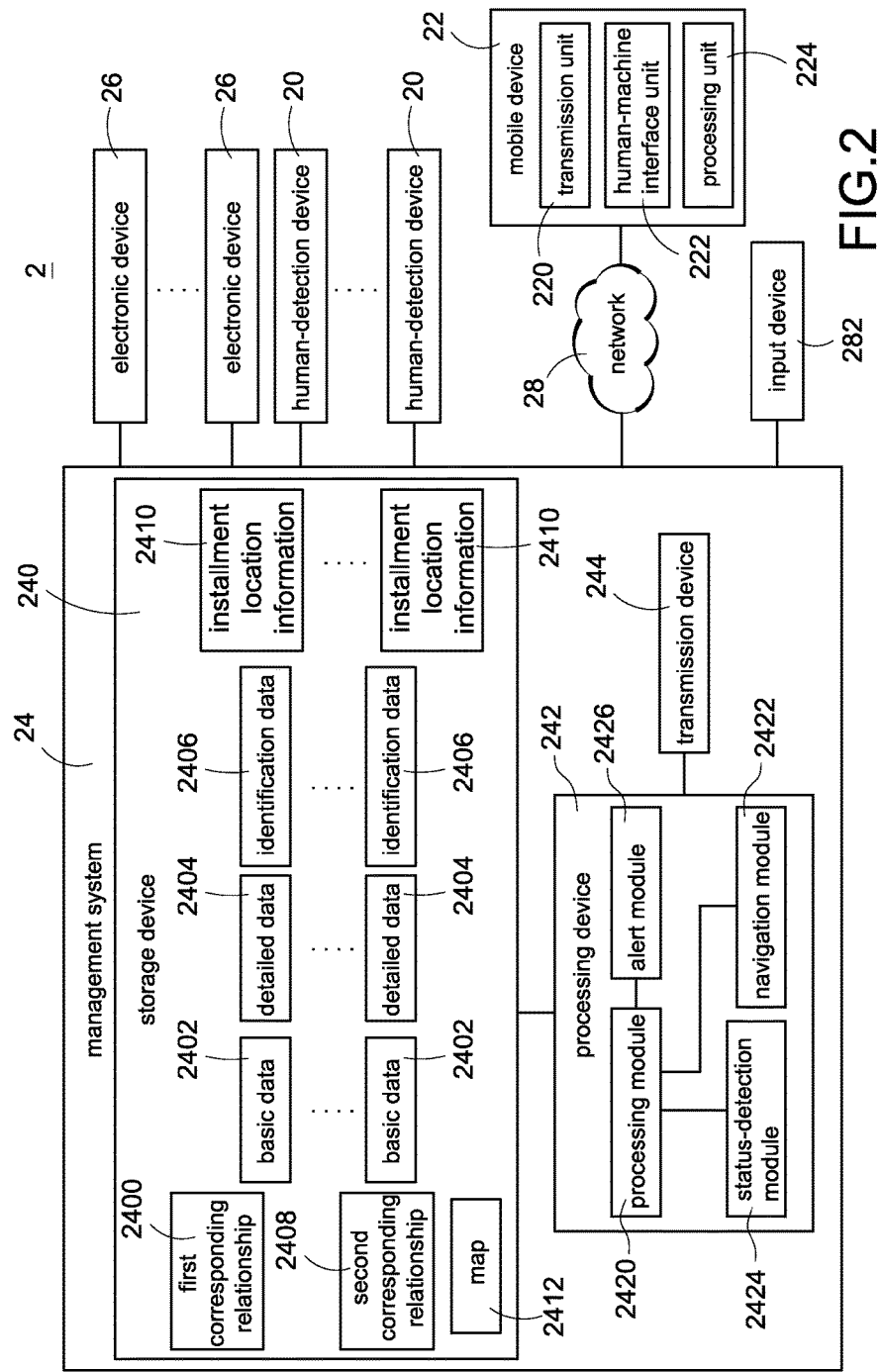
FIG. 2 is an architecture diagram of an active data push system according to a first embodiment of the present disclosed example.

As shown in FIG. 2, the active data push system 2 mainly comprises a plurality of human-detection devices 20 and a management system 24. The management system 24 can wiredly or wirelessly connect to the plurality of human-detection devices 20 and a plurality of electronic devices 26 installed in the data center. In the present disclosed example, the management system 24 can further remotely connect to a mobile device 22 held by a human (such as a human 30 shown in FIG. 3) via a network 28, but this specific example is not intended to limit the scope of the disclosed example.

In another embodiment of the disclosed example, the management system 24 also can simultaneously connect to the plurality of human-detection devices 20, the plurality of electronic devices 26 and the mobile device 22 held by the human 30 via the network 28

The plurality of electronic devices 26 is respectively installed in a plurality of zones of the data center. The plurality of electronic devices 26 can be the servers, the switches, the Uninterruptible Power Supplies (UPS), the power supplies, the routers or any combination of above devices, but this specific example is not intended to limit the scope of the disclosed example.

The plurality of human-detection devices 20 are respectively installed in the plurality of zones of the data center, and respectively execute a human-detection to detect the plurality of zones. More specifically, the plurality of human-detection devices 20 can continuously detect whether the human 30 entrance into one of the plurality of zones. When detecting the human 30 entrance into one of the plurality of zones, the human-detection device 20 installed in the zone detected with the human 30 entrance sends a trigger signal to the management system 24 to inform the management system 24 of the zone detected with the human 30 current entrance.

Preferably, the plurality of human-detection devices 20 can be the cameras, the Passive infrared sensor (PIR sensors), the thermal sensors or any combination of above devices, but this specific example is not intended to limit the scope of the disclosed example.

Besides, when the plurality of human-detection devices 20 are the cameras, each device 20 can respectively capture a zone image of the detected zone(s), and can execute an image recognition process to the captured zone image for actively executing human-detecting via recognizing whether the zone image comprises an image of the human 30.

When the plurality of human-detection devices 20 are the PIR sensors, each human-detection device 20 can respectively execute motion-detection to the detected zone(s) for actively detecting whether the human 30 entrance into one of the plurality of zones via infrared sensing technology When the plurality of human-detection devices 20 are the thermal sensors, each human-detection device 20 can respectively capture a thermal image of the detected zone(s), and can execute the image recognition process to the captured thermal image for actively executing human-detecting via recognizing whether the thermal image comprises a thermal image of the human 30.

In another embodiment of the disclosed example, at least one of the plurality of the human-detection devices 20 is the camera, and the camera can simultaneously execute the human-detection to the plurality of zones. For example, the human-detection devices 20 can capture a cross-zones image which comprises a plurality of images of the different zones (such as comprising an image of a first zone and an image of a second zone).

In other words, both the first zone and the second zone are located in a photographing range of the human-detection device 20. Then, the human-detection device 20 can respectively execute the image recognition process to the plurality of images of the different zones comprised in the cross-zones image for respectively actively detecting whether the human 30 entrance into one of the plurality of zones.

Preferably, the image recognition process is computer vision, human-detection image process, human-face recognition process, motion-detection image process or stay-detection image process, but this specific example is not intended to limit the scope of the disclosed example.

Please be noted that the number of the plurality of human-detection devices 20, the number of the plurality of the electronic device 26 and the number of the plurality of zones can be the same, be different or be partially same (such as only the number of the plurality of human-detection devices 20 and the number of the plurality of zones are the same), but this specific example is not intended to limit the scope of the disclosed example.

The mobile device 22 is mainly held by the human 30, and the mobile device 22 can execute data transmission with the management system 24 after establishing a network connection with the management system 24 via the network 28. The mobile device 22 comprises a transmission unit 220, a human-machine interface unit 222 and a processing unit 224. Preferably, the mobile device 22 is smart phone, tablet PC, laptop or wearable computer, but this specific example is not intended to limit the scope of the disclosed example.

The transmission unit 220 connects to the network 28 to execute data transmission. The human-machine interface unit 222 is used to display the data. The human-machine interface unit 222 can further accept an operation from the human 30. The processing unit 224 is electrically connected to the transmission unit 220 and the human-machine interface unit 222, and is used to control the mobile device 22. Furthermore, the processing unit 224 can receive data from outside via the transmission unit 220, process (such as visualization process of the data or picture-scaling process) and transmit the data to the human-machine interface unit 222 for displaying.

Every time the management system 24 receives the trigger signal, the management system 24 first determines that which human-detection device 20 installed in the specific zone sending the trigger signal, and secondly recognizes the zone of the human 30 entrance. Then, the management system 24 retrieves a basic data 2402 (such as device name, device serial number or device specification of each electronic device 26) of each electronic device 26 installed in the detected zone, transmits the plurality of retrieved basic data 2402 to the mobile device 22 held by the human 30.

More specifically, the management system 24 comprises a storage device 240, a processing device 242 and a transmission device 244. The processing device 242 is electrically connected to the storage device 240 and the transmission device 244.

The storage device 240 stores the plurality of basic data 2402 and a first corresponding relationship 2400 between the plurality of human-detection devices 20, the plurality of zones and the plurality of electronic devices 26. Among them, the plurality of basic data 2402 is respectively corresponded to the plurality of electronic devices 26.

The processing device 242 comprises a processing module 2420. The processing module 2420 can recognize the human-detection device 20 which sends the trigger signal according to the received trigger signal. And the processing module 2420 searches the first corresponding relationship 2400 for recognizing the zone of the human 30 entrance according to the recognized human-detection device 20. Then, the processing module 2420 searches for each electronic device 26 installed in the zone of the human 30 entrance according to the first corresponding relationship 2400, loads the basic data of each searched electronic device 26 from the storage device 240, and actively transmits the plurality of loaded basic data 2402 to the mobile device 22 held by the human 30 for displaying.

Thus, the human 30 can passively receive the basic data 2402 of the plurality of electronic devices 26 installed in the zone which the human 30 is in via the mobile device 22 without any operation.

Figure 3:
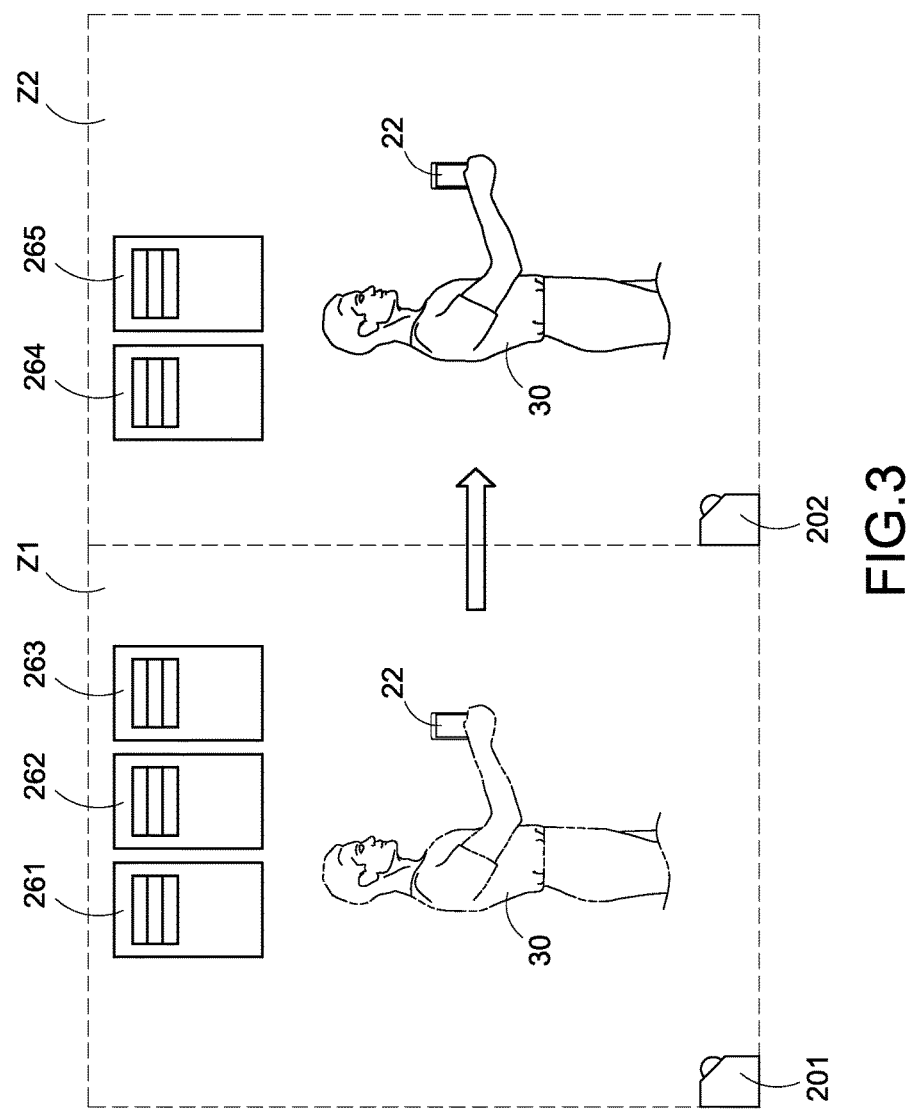
FIG. 3 is a schematic diagram of an active data push system according to a first embodiment of the present disclosed example.

Please also refer to FIG. 3, FIG. 4A and FIG. 4B. FIG. 3 illustrates a schematic diagram of an active data push system according to a first embodiment of the present disclosed example. FIG. 4A illustrates a first screen schematic diagram of a mobile device according to a first embodiment of the present disclosed example. FIG. 4B illustrates a second screen schematic diagram of a mobile device according to a first embodiment of the present disclosed example. FIG. 3, FIG. 4A and FIG. 4B are user to explain how the active data push system 2 of the present disclosed example to actively push data to the mobile device 22 held by the human 30.

As shown in FIG. 3, in this example, the data center is divided into two zones (respectively referred to as first zone Z1 and second zone Z2 in following description), and the data center comprises two human-detection device 20 (in this example, both the two human-detection device 20 are camera, and the two human-detection device 20 will be respectively referred to as human-detection device 201 installed in the first zone Z1 and human-detection device 202 installed in the second zone Z2) and five electronic device 26 (respectively referred to asthree electronic devices 261,262 and 263 installed in the first zone Z1, two electronic devices 264 and 265 installed in the second zone Z2 in following description).

After the human 30 enters the data center, the human 30 can move freely in the first zone Z1 and second zone Z2. Moreover, the human-detection device 201 can send the trigger signal to the management system 24 after detecting that human 30 entrance into the first zone Z1. After receiving the trigger signal, the management system 24 can recognize the received trigger signal to determine which human-detection device 201 sends the trigger signal. Then, the management system 24 can recognize that the human 30 is currently in the first zone Z1 according to the recognized human-detection device 201 and the first corresponding relationship 240. Finally, the management system 24 retrieves and transmits the plurality of the basic data 2402 of the plurality of the electronic devices 261-263 installed in the first zone Z1 to the mobile device 22 held by the human 30.

Thus, the mobile device 22 held by the human 30 can display the plurality of basic data of the plurality of electronic devices 261-263 on the human-machine interface unit 222 (as shown in FIG. 4A) for enabling the human 30 instantly view the basic data 2402 of the plurality electronic devices 261-263 installed in the zone which the human 30 is in.

When the human move to second zone Z2, the human-detection device 202 can detect that the human 30 entrance into the second zone Z2. At the same time, the human-detection device 202 can send the trigger signal to the management system 24 for making the management system 24 retrieve the plurality of basic data of the plurality of electronic devices 264-265 installed in the second zone Z2, and can transmit the retrieved basic data to the mobile device 22 held by the human 30.

Thus, the mobile device 22 held by the human 30 can display the plurality of basic data of the plurality of electronic devices 264-265 on the human-machine interface unit 222 (as shown in FIG. 4B) for enabling the human 30 instantly view the basic data 2402 of the plurality electronic devices 264-265 installed in the zone which the human 30 is in.

Please back to refer to FIG. 2, in another embodiment of the disclosed example, the disclosed example can further provide a detailed data searching function. More specifically, the storage device 240 of the management system 24 can further store a plurality of detailed data 2404 (such as the current status of the electronic device 26, operation parameter or operation history log). Among them, the plurality of basic data is respectively corresponded to the plurality of electronic devices 26.

More specifically, the human-machine interface 222 of the mobile device 22 can accept an electronic device selection operation after displaying the received basic data 2402. The processing unit 224 generates and transmits a detailed data request to the management system 24 according to the electronic device selection operation.

The transmission device 244 of the management system 24 receives the detailed data request via the network 28. The processing module 2420 of the processing device 242 can recognize the electronic device 26 corresponding to the received detailed data request (in other words, the electronic device 26 selected by the human 30), load the detailed data 2404 corresponding to the selected electronic device 26 from the storage device 240, and can return the detailed data 2404 to the mobile device 22 held by the human 30 via the transmission device 244.

Finally, the mobile device 22 held by the human 30 can display the detailed data 2404 on the human-machine interface 222 for making the human fast view the detailed data 2404 of the selected electronic device 26.

In another embodiment of the disclosed example, the active data push system 2 can further provide an auto-connection function. In this embodiment, the active data push system 2 can further comprise an input device 282. The input device 282 is connected to the management system 24. The input device 282 can be installed in a specific place (such as an entrance to the data center, inside of the data center or an office of the human 30).

The human 30 must execute a registration operation to the management system 24 for making an identification data of the human 30 (such as an employee serial number of the human 30 or a biometric identification information (such as fingerprint information, iris information or palm vein information) of the human 30) be corresponded to the mobile device 22 held by the human 30 and store in the management system 24 beforehand.

When the human 30 wants to enter the data center, the human 30 must input an input identification data to the input device 282. In this embodiment, the input identification data is corresponded to information of the human 30 (such as inputting the employee serial number via inducing an entrance guard induction card or inputting the biometric identification information via scanning fingerprint, iris or palm vein). Then, the input device 24 transmits the received input identification data to the management system 24. The management system 24 verifies whether the received input identification is correct (such as whether the input identification data is consistent with one of the plurality of identification data 2406 pre-stored in the storage device 240, wherein the plurality of identification data 2406 is respectively corresponded to the plurality of information of the different humans 30). If the management system 24 determines that the received input identification is consistent, the management system 24 actively connects to the mobile device 22 corresponding to the consistent identification data 2406 via the network 28. Thus, the human 30 can make the management system 24 actively establish a network connection with the mobile device 22 held by the human 30 without manually configuring the mobile device 22.

In another embodiment of the disclosed example, the active data push system 2 can further combine above auto-connection function and an entrance guard function. In this embodiment, the input device 282 is an entrance guard device. The entrance guard device is installed in the entrance to the data center.

More specifically, because the human 30 had made the identification data 2406 be corresponded to the mobile device 22 held by the human 30 when executing the registration operation, in this embodiment, the management system 24 can control a door of the data center to open for leading the human 30 to enter the inside of the data center after verifying that the input identification data is consistent. Moreover, the management system 24 can further actively connect to the mobile device 22 via network 28. Thus, the human 30 can receive the basic data 2402 transmitting from the management system 24 via mobile device 22 after entering the data center.

In another embodiment of the disclosed example, the active data push system 2 can further provide an electronic-device-location-marking function. More specifically, the storage device 240 further stores a second corresponding relationship 2408 between the plurality of identification data 2406 and the plurality of the electronic devices 26, a plurality of installment location information 2410 and a map 2412, wherein the plurality of installment location information 2410 respectively record the installment location of each electronic device 26 installed in the data center, the map 2412 is used to represent the distribution locations of hardware installed in the data center. Preferably, the map 2412 is a plan view of the data center.

In this embodiment, the processing module 2420 of the processing device 242 determines whether the received input identification data is consistent with any identification data 2406 after receiving the input identification data via the input device 282. If there is the identification data 2406 being consistent with the received input identification data, the processing module 2420 can search the second corresponding relationship 2408 for retrieving each electronic device 26 corresponding to the consistent identification data 2406 according to the consistent identification data 2406, and can load the installment location information 2410 of each electronic device 26 from the storage device 240. Then, the processing module 2420 marks the map 2412 according to the (plurality of) loaded installment location information 2410, and transmits the marked map 2412 to the mobile device 22 held by the human 30 via the transmission device 244.

Please refer to FIG. 5A and FIG. 5B. FIG. 5A illustrates an exemplary map according to a first embodiment of the present disclosed example. FIG. 5B illustrates an exemplary marked map according to a first embodiment of the present disclosed example. FIG. 5A and FIG. 5B are used to explain the electronic-device-location-marking function of this embodiment.

As shown in FIG. 5A, in this example, the map 2412 is the plan view of the data center. The data center comprises the first zone Z1, the second zone Z2, a third zone Z3 and a forth zone Z4. A plurality of electronic devices 261-273 are respectively installed in the plurality of zones Z1-Z4. The input device 282 is a RFID reader.

In this example, the identification data 2406 of the human 30 are exemplified to be corresponding to the plurality of electronic device 261, 262, 265 and 273. More specifically, the human 30 only has permission to maintain the plurality of electronic devices 261, 262, 265 and 273, and don't have permission to maintain the other electronic devices.

When the human 30 wants to enter the data center, the human 30 can take an induction card (take a RFID card for example) close to the input device 282 to input the input identification data stored in the induction card to the input device 282 via a way of induction.

Then, if the management system 24 determines that there is the identification data 2406 being consistent with the input identification data, the management system 24 actively connects to the mobile device 22 held by the human 30 via the network 28. Besides, the management system 24 retrieves the installment location information 2410 (take the plurality of installment location information 2410 of the plurality of electronic devices 261, 262, 265 and 273 for example) of each electronic device 26 corresponding to the consistent identification data 2406 according to the second corresponding relationship 2408. The management system 24 marks the plurality of electronic devices 261, 262, 265 and 273 on the map 2412 using a more obvious mark way (as the plurality of electronic devices 261, 262, 265 and 273 marked using the solid line shown in FIG. 5B) according to the retrieved installment location information 2410, and marks the other electronic devices on the map 2412 using a more non-obvious mark way (as the plurality of electronic devices 263, 264 and 266-272 marked using the dashed line shown in FIG. 5B). Then, the management system 24 transmits the marked map 2412 to the mobile device 22 held by the human 30 for displaying.

Thus, this embodiment can make the human fast know the location of the plurality of devices which the human has permission to maintain, and can effectively reduce the time of searching the specific electronic device.

Please refer back to FIG. 2, in another embodiment of the disclosed example, the active data push system 2 can further provide a navigation function for navigating the human 30 to the location of the specific electronic device 26. More specifically, the processing device 242 further comprises a navigation module 2422. The navigation module 2422 is connected to the processing module 2420.

The human 30 can send a navigation request which navigating to the designate electronic device 26 to the management system 24 via the mobile device 30.

After the navigation module 2422 receives the navigation request, the navigation module 2422 recognizes the zone which the human 30 is currently in via the plurality of the human-detection devices 20, and confirms the installment location of the designate electronic device 26 according to the installment location information 2410 of the designate electronic device 26. Then, the navigation module 2422 calculates a routing path from the zone which the human 30 is currently in to the installment location of the designate electronic device 26, marks the calculated routing path on the map 2412, and transmits the marked map 2412 to the mobile device 22 held by the human 30.

Although in this embodiment, the disclosed example takes that the human 30 operating the mobile device 22 to designate the electronic device 26 for example, but this specific example is not intended to limit the scope of the disclosed example.

In another embodiment of the disclosed example, the human 30 can designate at least one of the plurality of electronic devices 26 beforehand. When the management system 24 receives the notification of the human 30 entrance into the data center, the management system 24 actively transmits the marked map 2412 to the mobile device 22 held by the human 30. Thus, this embodiment can effectively dispense with the operation of immediately designating the electronic device.

Figure 5C:
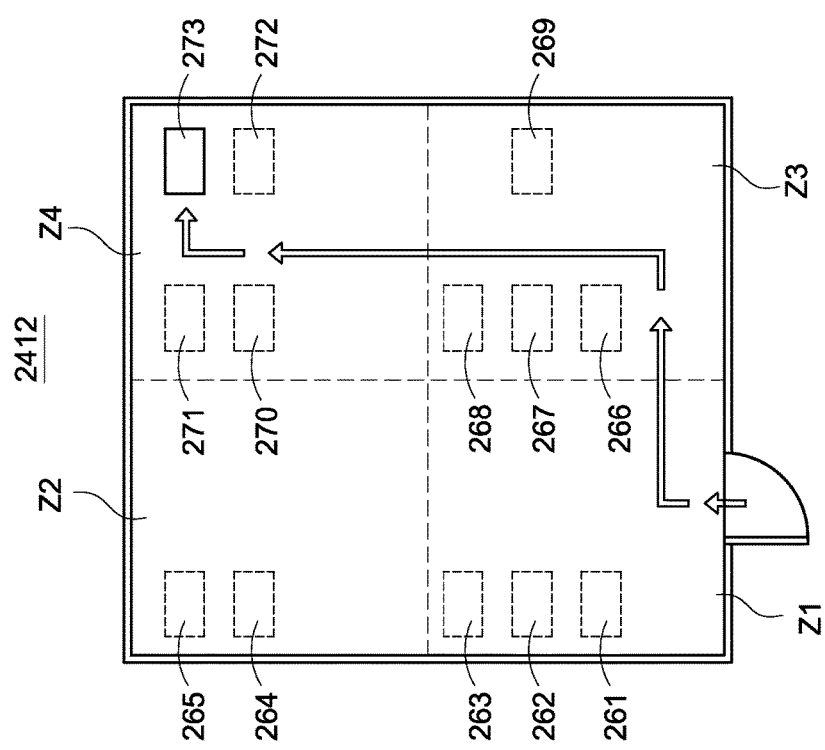
FIG. 5C is an exemplary navigation map according to a first embodiment of the present disclosed example.

Please simultaneously refer to FIG. 5A and FIG. 5C. FIG. 5A is same as the previously description, the relevant description is omitted for brevity. FIG. 5C illustrates an exemplary navigation map according to a first embodiment of the present disclosed example. FIG. 5A and FIG. 5C are used to explain the navigation function of this embodiment.

When the human 30 wants to go to the location of the specific electronic device, the human 30 can designate one of the plurality of electronic devices 26 using the mobile device 22 (take designating the electronic device 273 for example), and lead the mobile device 22 to send the navigation request of navigating to the installment location of the electronic device 273 to the management system 24.

After the management system 24 receives the navigation request, the management system 24 first retrieves the location of the human 30 (in this example the human 30 is in the first zone Z1) and the installment location of the designate electronic device 273 (in this example, the electronic device 273 is installed in the fourth zone Z4.). Then, the management system 24 calculates the routing path from the first zone Z1 to the installment location of the electronic device 273, marks the routing path on the map 2412 (as the arrow symbols shown in FIG. 5C), and transmits the marked map 2412 to the mobile device 22 held by the human 30.

Thus, this embodiment can make the human fast know the how to go to the location of the specific electronic device, and can effectively reduce the time of searching the specific electronic device.

Please back to refer to FIG. 2, in another embodiment of the disclosed example, the active data push system 2 can further provide a surveillance and alarm function. The surveillance and alarm function can issue an alarm when the status of any electronic device 26 beside the human 30 is abnormal. More specifically, the processing device 242 further comprises a status-detection module 2424 and an alarm module 2426. The processing module 2420 is connected to the status-detection module 2424 and the alarm module 2426, and the status-detection module 2424 is connected the alarm module 2426 via the processing module 2420.

The status-detection module 2424 can continuously detects a current status of each electronic device 26, and can send an alarm signal to the alarm module 2426 when detecting one of the electronic devices is abnormal. After the alarm module 2426 receives the alarm signal, the alarm module 2426 determines whether the zone which the human is in is consistent with the zone which the abnormal electronic device 26 is installed in. If the zone which the human is in is not consistent with the zone which the abnormal electronic device 26 is installed in, the alarm module 2426 temporarily stores the alert signal, otherwise, the alarm module 2426 generates and transmits an alarm message (such as a warning sound, a warning text or a warning image) to the mobile device 22 held by the human 30 to display or play for reminding the human 30 that the status of the electronic device 26 installed beside him/her is abnormal.

Thus, this embodiment can effectively make the human know that whether there is the electronic device 26 which has the abnormal status and is beside the human, and lead the human to immediately deal with the abnormal status of the abnormal electronic device.

Please note that the processing module 2420, the navigation module 2422m the status-detection module 2424 and the alarm module 2426 may be implemented by hardware modules like electronic circuit or integrated circuit with recorded digital circuits, or implemented by software modules, e.g. program, Application Programming Interface (API) or firmware, but are not limited to aforementioned examples. When aforementioned modules are implemented by software modules, the connections between the modules mean the links of the programs.

More specifically, the storage device 240 can further store a computer program, The computer program contains computer-executable program codes or machine codes used to implement aforementioned modules 2420-2426 being comprised in the processing device 242. When the processing device 242 executes computer-executable program codes or the machine codes, the processing device 242 can implement the functions of aforementioned modules 2420-2426.

Figure 6:
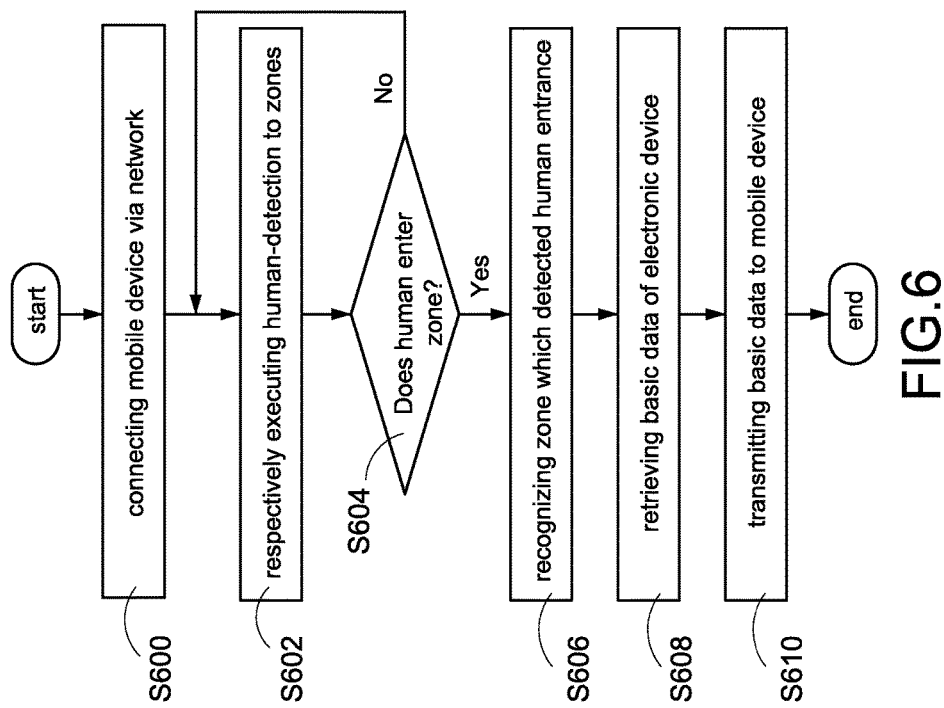
FIG. 6 is a flowchart of an active data push method according to a first embodiment of the present disclosed example.

Please refer to FIG. 6, which illustrates a flowchart of an active data push method according to a first embodiment of the present disclosed example. The active data push method of this embodiment is applied to the active data push system 2 shown in FIG. 2.

Step S600: the management system 24 connects to the mobile device 22 held by the human 30 via the network 28.

Step S602: respectively execute the human-detection to the plurality of zones. More specifically, each human-detection device 20 uses a detection technology (such as motion-detection technology or image-recognition technology) to execute human-detection to the plurality of zones. Preferably, the plurality of human-detection devices 20 are PIR sensors, the PR sensors respectively execute human-detection to the plurality of zones.

Step S604: determine whether the human 30 entrance into the plurality of zones. More specifically, each human-detection device 20 detects the zone(s) to detect whether the human 30 entrance into any detected zone according to above way of detection. Besides, if any human-detection device 20 detects that the human 30 entrance into the detected zone, the human-detection device 20 sends the trigger signal to the management system 24 and performs the step S606; if none of the human-detection devices 20 detects that the human 30 entrance into one of the zones, the human-detection devices 20 repeatedly performs the step S602 to continuously detecting.

Step S606: recognize the zone detecting the human 30 entrance. More specifically, after the management system 24 receives the trigger signal, the management system 24 first recognizes the human-detection device 20 sends the trigger signal, and searches the first corresponding relationship 2400 according to the recognized human-detection device 20 to confirm the zone of the human entrance.

Step S608: retrieve the basic data 2402 of the electronic device 26. More specifically, the management system 24 loads the basic data 2402 of the electronic device 26 installed in the zone detecting the human 30 entrance from the storage device 240.

Step S610: the management device 24 transmits the (plurality of) the basic data 2402 retrieved in the step S608 to the mobile device 22 held by the human 30 via network 28.

Figure 7A:
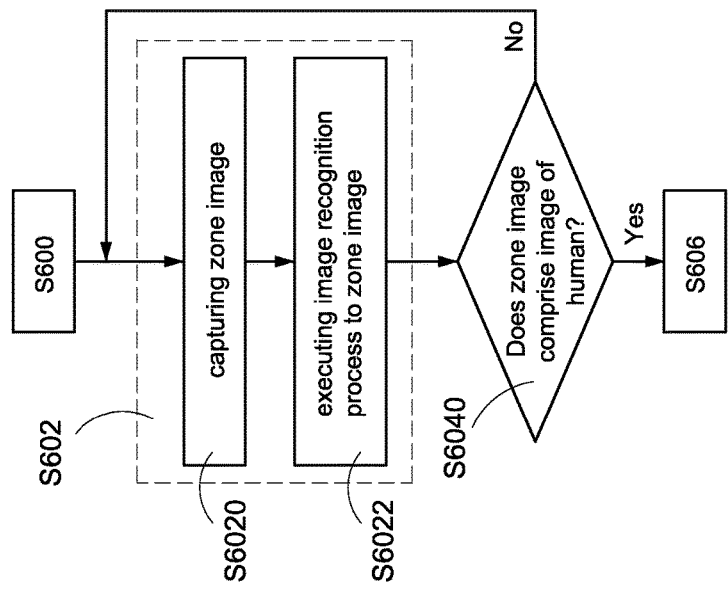
FIG. 7A is a first detail flowchart of step S602 and step S604 of FIG. 6.

Please refer to FIG. 7A, which illustrates a first detailed flowchart of step S602 and step S604 of FIG. 6. FIG. 7A is used to explain another embodiment of the active data push method of the disclosed example. In this embodiment, the plurality of human-detection devices 20 are camera, and each human-detection device 20 only executes the human-detection to only one zone. The step S602 comprises following steps.

Step S6020: each human-detection device 20 captures the zone image of the detected zone.

Step S6022: execute the image recognition process to the captured zone image. More specifically, each human-detection device 20 respectively executes the image recognition process to the captured zone image for executing human-detection.

In this embodiment the step S604 comprises following step.

Step S6040: each human-detection device 20 respectively determines whether the zone image comprises the image of the human 30. If the zone image comprises the image of the human 30, the human-detection device 20 determines that the human 30 entrance into the detected zone, sends the trigger signal to the management system 24, and performs the step S606; otherwise, the human-detection devices 20 repeatedly performs the step S6020 to continuously detecting.

Figure 7C:
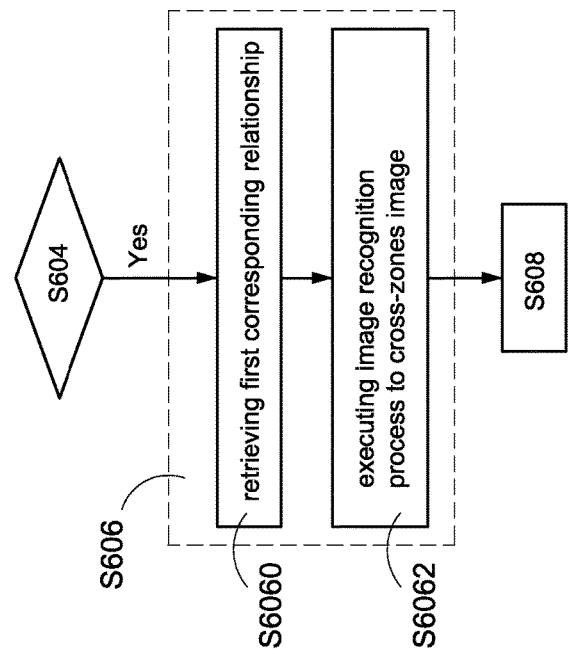
FIG. 7C is a first detail flowchart of step S606 of FIG. 6.
Figure 7B:
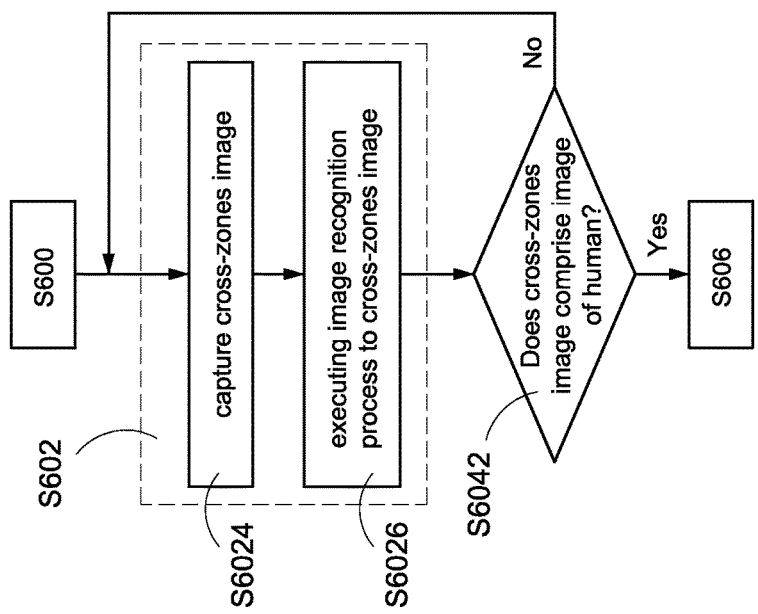
FIG. 7B is a second detail flowchart of step S602 and step S604 of FIG. 6.

Please refer to FIG. 7B, which illustrates a second detailed flowchart of step S602 and step S604 of FIG. 6. FIG. 7B is used to explain another embodiment of the active data push method of the disclosed example. In this embodiment, the plurality of human-detection devices 20 are camera, and each human-detection device 20 can simultaneously execute the human-detection to a plurality of zones. The step S602 comprises following steps.

Step S6024: each human-detection device 20 respectively captures the cross-zones image of the plurality of detected zones.

Step S6026: execute the image recognition process to the cross-zones image. More specifically, each human-detection device 20 respectively executes the image recognition process to the captured cross-zones image for executing human-detection to each zone located in the photographing range. Preferably, each human-detection device 20 first divides the cross-zones image into a plurality of sub-images, wherein each sub-image is responded to one zone. Then, the human-detection device 20 respectively executes the image recognition process to the sub-images to execute human-detection.

In this embodiment, the step S604 comprises following step.

Step S6042: each human-detection device 20 respectively determines whether the cross-zones image comprises the image of the human 30. Preferably, each human-detection device 20 respectively determines whether each sub-image comprises the image of the human 30. If any sub-image comprises the image of the human 30, the human-detection device 20 determines that the human 30 entrance into the detected zone, sends the trigger signal to the management system 24, and performs the step S606; otherwise, the human-detection devices 20 repeatedly performs the step S6024 to continuously detecting.

Please refer to FIG. 7C, which illustrates a first detailed flowchart of step S606 of FIG. 6. FIG. 7C is used to explain another embodiment of the active data push method of the disclosed example. The step S606 comprises following steps.

Step S6060: retrieving the first corresponding relationship 2400. More specifically, the management system 24 retrieves the first corresponding relationship 2400 between the plurality of human-detection devices 20, the plurality of zones and the plurality of electronic devices 26.

Step S6062: search the first corresponding relationship 2400 to determine the zone detecting the human 30 entrance according to the human-detection device 20. More specifically, the management system 24 first recognizes the human-detection devices 20 sending the trigger signal, and recognizes the zone corresponding to the recognized human-detection devices 20 (in other words, the installment zone of the human-detection devices 20) according to the first corresponding relationship 2400.

Figure 8:
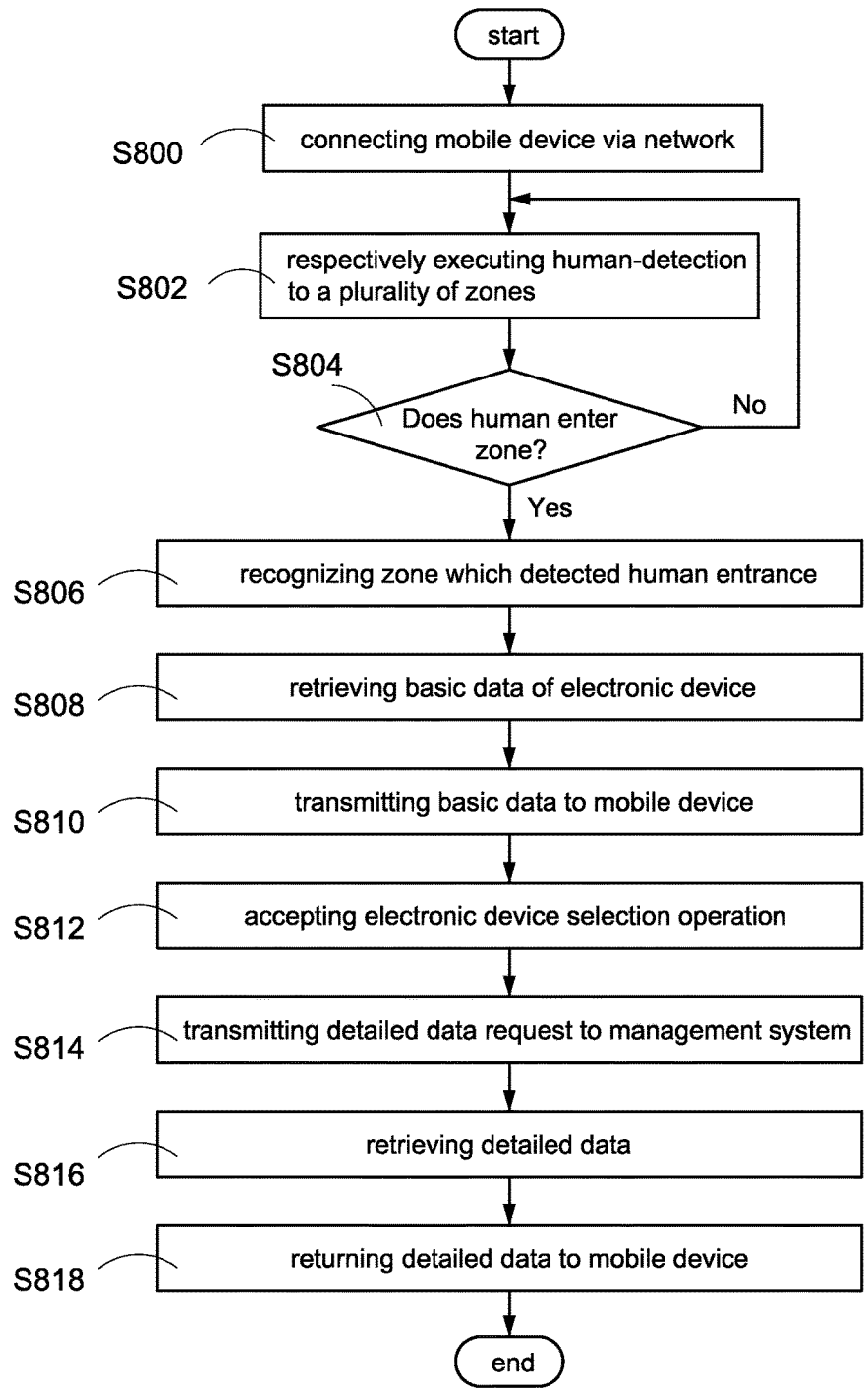
FIG. 8 is a flowchart of an active data push method according to a second embodiment of the present disclosed example.

Please refer to FIG. 8, which illustrates a flowchart of an active data push method according to a second embodiment of the present disclosed example. The active data push method of this embodiment is used to the active data push system 2 shown in FIG. 2.

The steps S800-S810 are similar to the steps S600-S610 shown in FIG. 6 respectively, the relevant description is omitted for brevity.

Step S812: the mobile device 22 accepts the electronic device selection operation from the human 30.

Step S814: the mobile device 22 transmits the detailed data request to the management system 24 according to the accepted electronic device selection operation.

Step S816: retrieve the detailed data 2404. More specifically, after the management system 24 receives the detailed data request, the management system 24 loads the detailed data 2404 corresponding to the selected electronic device 26 from the storage device 240.

Step S818: the management system 24 returns the detailed data 2404 retrieved in the step S816 to mobile device 22 held by the human 30. Thus, the active data push method of this embodiment can provide the detailed data searching function.

Figure 9:
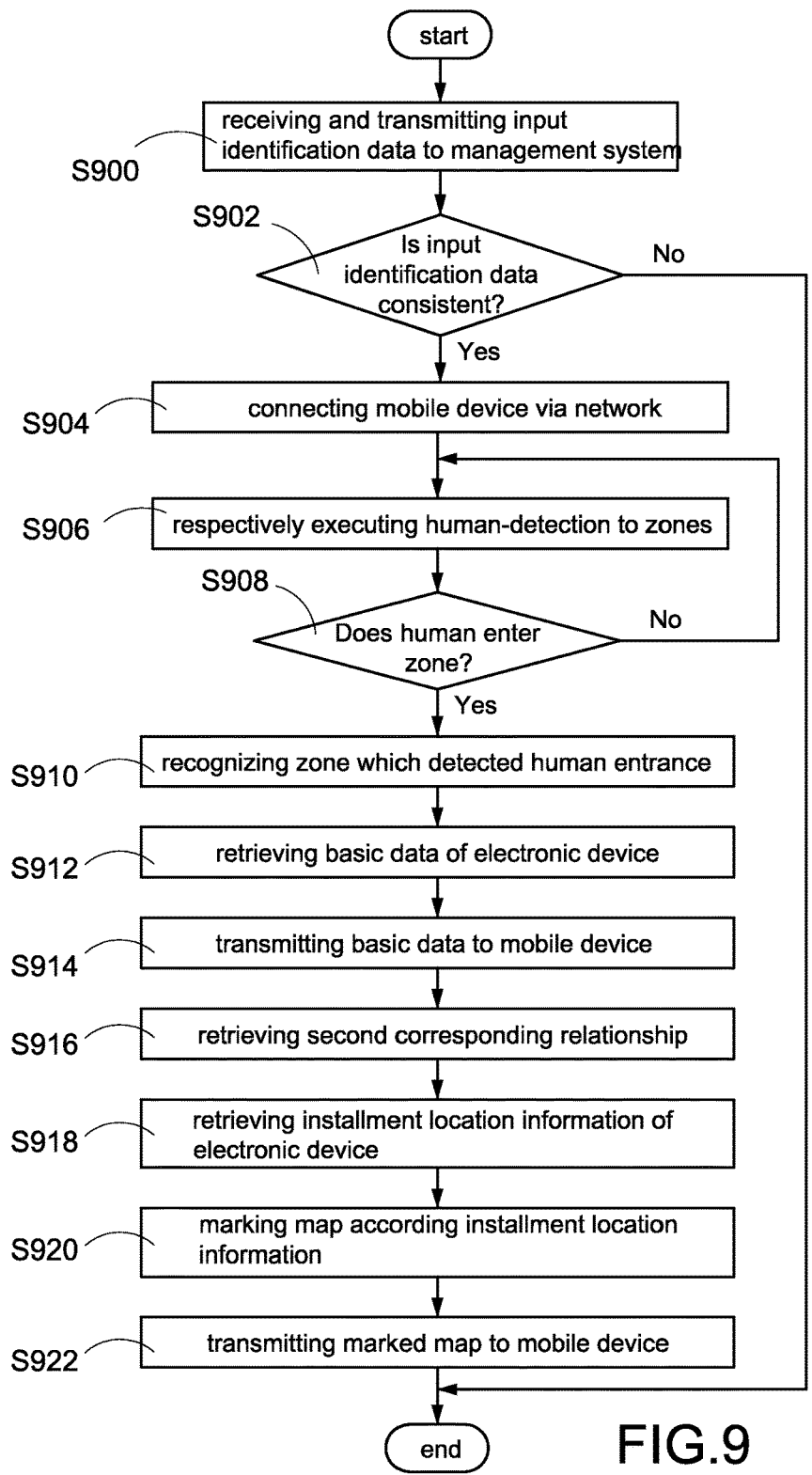
FIG. 9 is a flowchart of an active data push method according to a third embodiment of the present disclosed example.

Please refer to FIG. 9, which illustrates a flowchart of an active data push method according to a third embodiment of the present disclosed example. The active data push method of this embodiment is used to the active data push system 2 shown in FIG. 2.

Step S900: the input device 282 receives and transmits the input identification data inputted by the human 30 to the management system 24.

Step S902: determine whether the input identification data is consistent with one of the plurality of identification data 2406. More specifically, the management system 24 compares the input identification data with each one of the plurality of identification data 2406 to determine whether any identification data 2406 stored in the storage device 240 is consistent with the input identification data. If there is the consistent identification data 2406, the management system 24 performs the step S9041; otherwise, the management system 24 terminates the active data push method. Thus, the active data push method of this embodiment can provide the auto-connection function.

In another embodiment of the disclosed example, the input device 282 is the entrance guard device. Besides, in the step S902, if there is the consistent identification data 2406, the management system 24 can control the corresponded door to open for the human 30, and can perform the step S904. Thus, the active data push method of this embodiment can simultaneously provide the auto-connection function and the entrance guard function.

The steps S904-S914 are similar to the steps S600-S610 shown in FIG. 6 respectively, the relevant description is omitted for brevity.

In this embodiment, the active data push method can further provide the electronic-device-location-marking function via the following steps.

Step S916: the management system 24 retrieves the second corresponding relationship 2408 between the plurality of identification data 2406 and the plurality of the electronic device 26.

Step S918: retrieve the installment location information 2410 of each electronic device 26 corresponding to the identification data 2406. More specifically, the management system 24 first retrieves the identification data 2406 being consistent with the input identification data, and searches the second corresponding relationship 2408 according to the consistent identification data 2406 to retrieve the installment location information 2410 of each electronic device 26 corresponding to the consistent identification data 2406.

Step S920: the management system 24 marks the map 2412 according to the (plurality of) installment location information 2410 for marking all the installment location of all electronic devices 26 corresponding to the input identification data in the map 2412.

Step S922: the management system 24 transmits the marked map 2412 to the mobile device 22 held by the human 30 via the network 28.

Figure 10:
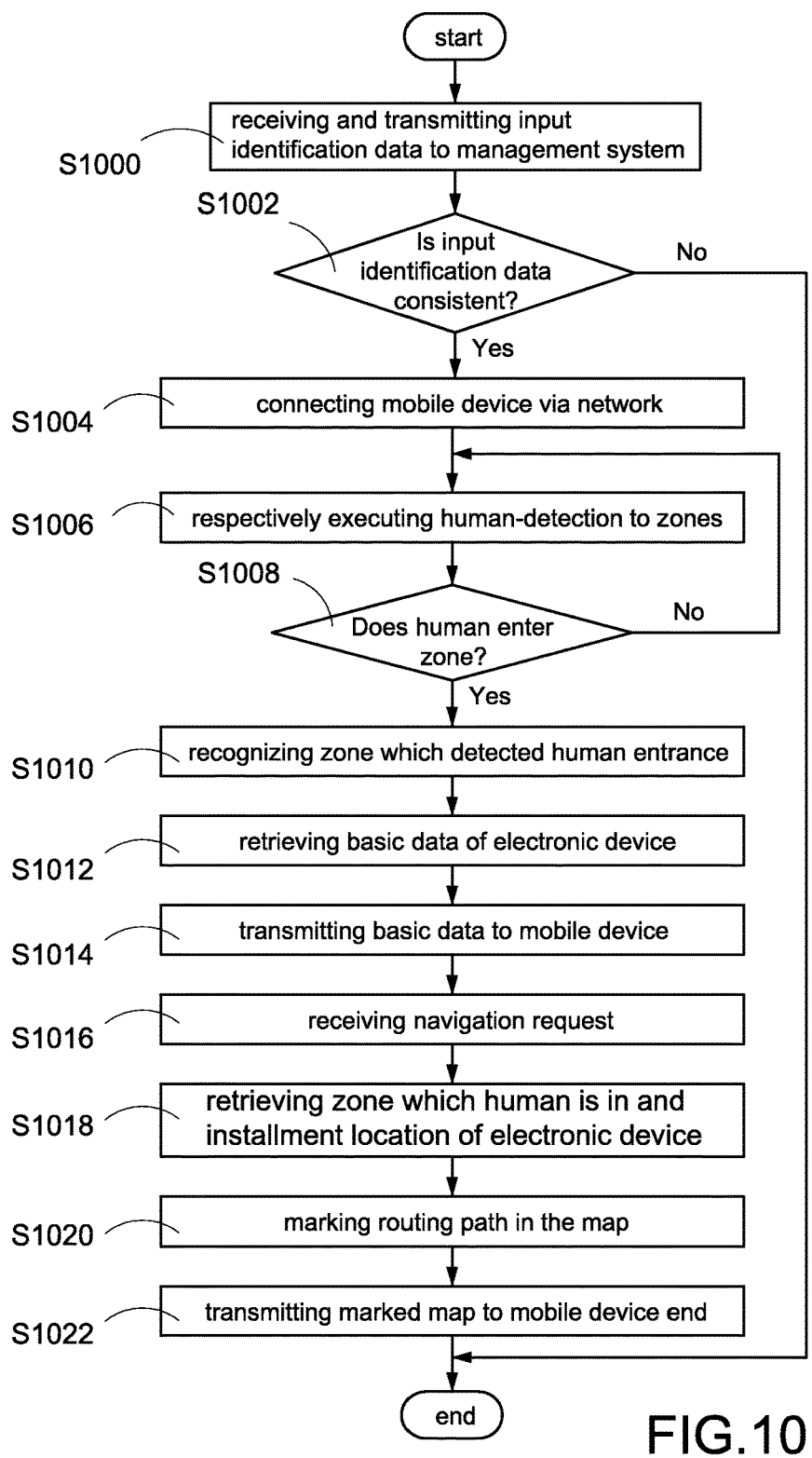
FIG. 10 is a flowchart of an active data push method according to a forth embodiment of the present disclosed example.

Please refer to FIG. 10, which illustrates a flowchart of an active data push method according to a forth embodiment of the present disclosed example. The active data push method of this embodiment is applied to the active data push system 2 shown in FIG. 2.

The steps S1000-S1014 are similar to the steps S900-S914 shown in FIG. 9 respectively, the relevant description is omitted for brevity.

Step S1016: receive the navigation request. More specifically, the management system 24 receives the navigation request of navigating from the zone which the human 30 is in to the designated electronic device 26 from the mobile device 26. Preferably, the navigation request is generated by operating the mobile device by the human 30, but this specific example is not intended to limit the scope of the disclosed example.

In another embodiment of the disclosed example, the human 30 can register the electronic device 26 which the human 30 wants to maintain to the management system 24 beforehand. Besides, the input device 282 (in this embodiment, the input device 282 is installed in the entrance to the data center or inside of the data center) simultaneously transmits the input identification data and the navigation request to the management system 24.

Step S1018: retrieve the zone which the human 30 is in and the installment location of the electronic device 26. More specifically, the management system 24 recognizes the zone which the human 30 is in and recognized in the step S1010, loads the installment location information 2410 of the designated electronic device 26 from the storage device 240, and calculates the routing path according to the zone which the human 30 is in and the installment location.

Step S1020: the management system 24 marks the routing path on the map 2412.

Step S1022: the management system 24 transmits the marked map 2412 to the mobile device 22 held by the human 30 via the network 28. Thus, the active data push method of this embodiment can provide the navigation function.

Figure 11:
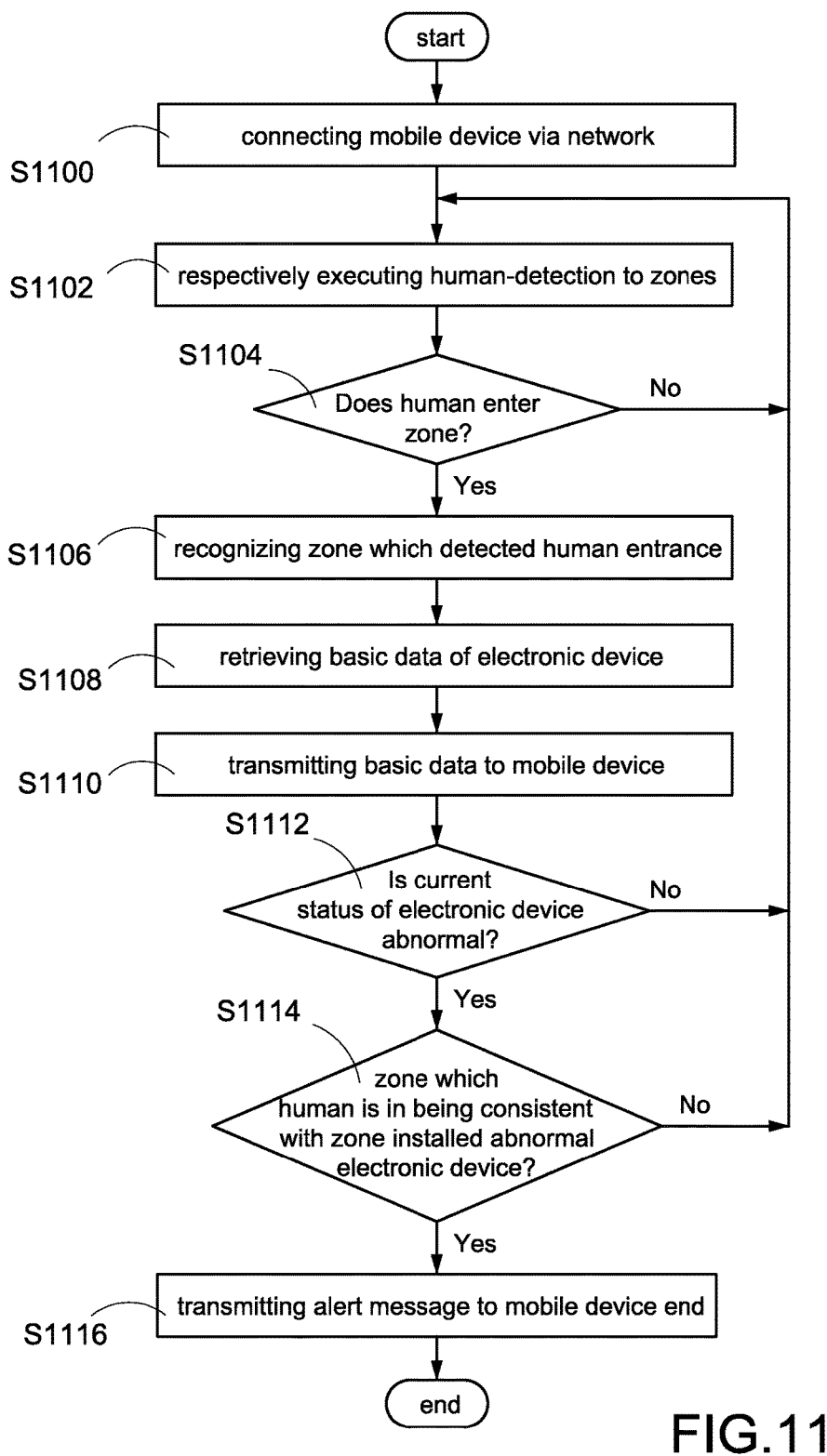
FIG. 11 is a flowchart of an active data push method according to a fifth embodiment of the present disclosed example.

Please refer to FIG. 11, which illustrates a flowchart of an active data push method according to a fifth embodiment of the present disclosed example. The active data push method of this embodiment is used to the active data push system 2 shown in FIG. 2.

The steps S1100-S1110 are similar to the steps S600-S610 shown in FIG. 6 respectively, the relevant description is omitted for brevity.

Step S1112: the management system 24 determines whether one of the plurality of electronic devices 26 is abnormal. If the management system 24 determines one of the plurality of electronic devices 26 is abnormal, performs the step S1114; otherwise, performs the step S1102 to continuously detecting whether the human 30 entrance into one of the plurality of zones.

Step S1114: the management system 24 determines whether the zone which the human is in is consistent with the zone which the abnormal electronic device 26 is installed in. If the zone which the human is in is consistent with the zone which the abnormal electronic device 26 is installed in, the management system 24 performs the step 1116; otherwise, performs the step S1102 to continuously detecting whether the human 30 entrance into one of the plurality of zones.

Step S1116: the management system 24 transmits the alarm message to the mobile device 22 held by the human 30 via the network 28. Thus, the active data push method of this embodiment can provide the surveillance and alarm function.

Compare to the related-art, because the present disclosed example mustn't paste the corresponded identifiers on the corresponded electronic devices, the present disclosed example can effectively prevent from the mistake that the electronic device is not consistent with the pasted identifier, and can effectively omit from maintaining the identifiers.

Besides, because the human doesn't have to execute reading operation to the identifiers, the installment locations of the electronic devices are not limited. In other words, it is not necessary to reserve the activity space in the installment location of the electronic device for providing the human to reading the identifiers beforehand.

In the present disclosed example, after the human entrance into any zone, the management system can actively push the data of all electronic devices installed in the zone which the human is in to the human, and can lead the human conveniently and fast to receive the data of all electronic devices installed in the zone which the human is in.

In the present disclosed example, because all the relevant information of the electronic devices is managed and maintained by the management system, the present disclosed example can effectively prevent from the information of the electronic devices being leaked caused by the identifiers being forged or illegally copied.

In cooperation with the attached drawings, the technical contents and detailed description of the present invention are described thereinafter according to a preferable embodiment, being not used to limit its executing scope. Any equivalent variation and modification made according to appended claims is all covered by the claims claimed by the present invention.

What is claimed is:

1. An active data push system comprising:
    a plurality of human-detection devices respectively detecting a plurality of zones, and sending a trigger signal when detecting entrance of a human user of a mobile device into one of the zones; and
    a management system connected to the human-detection devices and comprising a processing device, the processing device comprising a status-detection module and an alarm module connected to the status-detection module,
    wherein
        the management system recognizes the zone corresponding to the trigger signal when receiving the trigger signal, the management system retrieves a plurality of basic data of a plurality of electronic devices installed in the recognized zone, and transmits the retrieved basic data to the mobile device via a network,
        the status-detection module detects whether the electronic devices are abnormal, and
        the alarm module determines whether the zone corresponding to the trigger signal is consistent with the zone in which the abnormal electronic device is installed, and transmits an alarm message to the mobile device when determining that the zone corresponding to the trigger signal is consistent with the zone in which the abnormal electronic device is installed.

2. The active data push system according to claim 1, wherein at least one of the human-detection devices is a camera, the camera captures a zone image of the detected zone, and executes an image recognition process to the zone image for detecting whether the human entrance into the zone.

3. The active data push system according to claim 1, wherein at least one of the human-detection devices is a camera, the camera captures a cross-zones image, the cross-zones image comprises a plurality of images of the zones, the camera executes an image recognition process to the images of the zones for simultaneously detecting whether the human entrance into the zones.

4. The active data push system according to claim 1, wherein at least one of the human-detection devices is a PIR (Passive infrared) sensor, the PIR sensor executes a motion-detection to the detected zone for detecting whether the human entrance into the zone.

5. The active data push system according to claim 1, wherein the management system comprises:
    a storage device storing a first corresponding relationship between the human-detection devices, the zones and the electronic devices; and
    a processing device connected to the storage device recognizing the human-detection device sent the trigger signal, searching the first corresponding relationship for confirming the zone corresponding to the trigger signal according to the recognized human-detection device, and loading the basic data of the electronic device installed in the zone from the storage device.

6. The active data push system according to claim 1, wherein the management system comprises:
    a transmission device receiving a detailed data request sent from the mobile device, wherein the detailed data request is corresponded to the selected one of the electronic devices; and
    a processing device connected to the transmission device retrieving a detailed data of the selected electronic device according to the detailed data request, and returning the detailed data to the mobile device via the transmission device.

7. The active data push system according to claim 1, further comprising:
    an input device connected to the management system receiving and transmitting an input identification data to the management system, the management system actively connecting to the mobile device when determining that the input identification data is consistent with an identification data stored inside, wherein the identification data records an information of the human, and the identification data is corresponded to the mobile device held by the human.

8. The active data push system according to claim 7, wherein the manage system comprises:
    a transmission device;
    a storage device storing a second corresponding relationship between the identification data and the electronic devices, an installment location information of each electronic device and a map of the zones; and
    a processing device connected to the transmission device and the storage device comprising:
        a processing module, the processing module loading the installment location information of each electronic device corresponding to the consistent identification data according to the second corresponding relationship, marking the map according to the loaded installment location information, and transmitting the marked map to the mobile device via the transmission device.

9. The active data push system according to claim 8, wherein the processing device further comprises:
   a navigation module connected to the processing module retrieving the zone corresponding to the trigger signal and an installment location of a designate electronic device when receiving a navigation request of navigating to the designate electronic device, marking a routing path from the zone to the installment location in the map, and transmitting the marked map to the mobile device.

10. An active data push method used to an active data push system, the active data push system comprising a plurality of human-detection devices and a management system, the management system being connected to a plurality of electronic devices respectively installed in the different zones, the active data push method comprising following steps:
   a) the management system connecting to a mobile device via a network;
   b) the human-detection devices respectively executing human-detection to the zones, and sending a trigger signal when detecting that entrance of a human user of the mobile device into the zone;
   c) the management system recognizing the zone corresponding to the trigger signal when receiving the trigger signal;
   d) retrieving a basic data of each electronic device installed in the recognized zone;
   e) transmitting the basic data to the mobile device; and
   f) transmitting an alarm message to the mobile device when one of the electronic devices is abnormal and the zone corresponding to the trigger signal is consistent with the zone in which the abnormal electronic device is installed.

11. The active data push method according to claim 10, wherein at least one of the human-detection devices is a camera, the step b) comprises following steps:
   b1) capturing a zone image of the detected zone; and
   b2) executing an image recognition process to the zone image, and determining that the human entrance into the detected zone if the zone image comprises an image of the human.

12. The active data push method according to claim 10, wherein at least one of the human-detection devices is a camera, the step b) comprises following steps:
   b3) capturing a cross-zones image, wherein the cross-zones image comprises the images of the zones; and
   b4) respectively executing an image recognition process to the images of the zones, and determining the human entrance into the detected zone if one of the images of the zones comprises an image of the human.

13. The active data push method according to claim 10, wherein at least one of the human-detection devices is a PIR (Passive infrared) sensor, the step b) is to execute a motion-detection to the detected zone for detecting whether the human entrance into the zone.

14. The active data push method according to claim 10, wherein the step c) comprises following steps:
   c1) retrieving a first corresponding relationship between the human-detection devices, the zones and the electronic devices when receiving the trigger signal; and
   c2) recognizing the human-detection device sent the trigger signal, searching the first corresponding relationship for confirming the zone corresponding to the trigger signal according to the recognized human-detection device; wherein the step d) is to retrieve the basic data of each electronic device installed in the zone.

15. The active data push method according to claim 10, further comprising following steps:
   g1) the mobile device accepting an electronic device selection operation;
   g2) sending a detailed data request to the management system according to the accepted electronic device selection operation, wherein the detailed data request is corresponded to the selected one of the electronic devices;
   g3) the management system retrieving a detailed data of the selected electronic device according to the detailed data request; and
   g4) returning the detailed data to the mobile device.

16. The active data push method according to claim 10, wherein the step a) comprises following steps:
   a1) an input device receiving and transmitting an input identification data to management system; and
   a2) the management system actively connecting to the mobile device via the network when the input identification data is consistent with an identification data stored inside, wherein the identification data records an information of the human, and the identification data is corresponded to the mobile device held by the human.

17. The active data push method according to claim 16, further comprising following steps:
   h1) retrieving a second corresponding relationship between the identification data and the electronic devices;
   h2) retrieving an installment location information of each electronic device corresponding to the consistent identification data according to the second corresponding relationship;
   h3) marking a map according to the installment location information; and
   h4) transmitting the marked map to the mobile device.

18. The active data push method according to claim 16, further comprising following steps:
   i1) receiving a navigation request of navigating to a designate electronic device;
   i2) retrieving the zone corresponding to the trigger signal and an installment location of the designate electronic device;
   i3) marking a routing path from the zone to the installment location in a map; and
   i4) transmitting the marked map to the mobile device.

* * * * *